(12) United States Patent
Watson et al.

(10) Patent No.: US 10,828,601 B2
(45) Date of Patent: Nov. 10, 2020

(54) PROCESS FOR REMOVING METHANE FROM A GAS

(71) Applicant: Johnson Matthey Davy Technologies Limited, London (GB)

(72) Inventors: David Watson, Stockton-on-Tees (GB); John Swinney, Stockton-on-Tees (GB)

(73) Assignee: Johnson Matthey Davy Technologies Limited, London (GB)

( * ) Notice: Subject to any disclaimer, the term of this patent is extended or adjusted under 35 U.S.C. 154(b) by 247 days.

(21) Appl. No.: 15/021,630

(22) PCT Filed: Oct. 17, 2014

(86) PCT No.: PCT/GB2014/053126
§ 371 (c)(1),
(2) Date: Mar. 11, 2016

(87) PCT Pub. No.: WO2015/059453
PCT Pub. Date: Apr. 30, 2015

(65) Prior Publication Data
US 2016/0228815 A1 Aug. 11, 2016

(30) Foreign Application Priority Data

Oct. 21, 2013 (GB) .................................. 1318592.1

(51) Int. Cl.
*B01D 53/86* (2006.01)
(52) U.S. Cl.
CPC .... *B01D 53/864* (2013.01); *B01D 2255/1021* (2013.01); *B01D 2255/1023* (2013.01);
(Continued)

(58) Field of Classification Search
None
See application file for complete search history.

(56) References Cited

U.S. PATENT DOCUMENTS

| | | | |
|---|---|---|---|
| 2012/0189523 A1 | 7/2012 | Ohtsuka et al. | |
| 2012/0263635 A1* | 10/2012 | Cork ...................... | B01D 53/72 423/245.3 |

FOREIGN PATENT DOCUMENTS

| | | |
|---|---|---|
| CN | 101206027 A | 6/2008 |
| CN | 101418702 A | 4/2009 |

(Continued)

OTHER PUBLICATIONS

International Search and Written Opinion for PCT/GB2014/053126 dated Nov. 27, 2014.
(Continued)

*Primary Examiner* — Anita Nassiri-Motlagh
(74) *Attorney, Agent, or Firm* — BakerHostetler

(57) ABSTRACT

In a method for removing methane from feed gas having a methane concentration of 2 mole % or less, the feed gas is optionally mixed with make-up methane or air and passed through a heat exchanger to heat the gas to an oxidation reactor inlet temperature $T_1$. The heated stream is passed to the reactor where the methane is oxidised. A gas stream including the products of the oxidation reaction are removed with the gas stream being at a reactor outlet temperature $T_2$ higher than the inlet temperature $T_1$. The gas stream is then passed through the heat exchanger against the reactor stream to recover heat from the gas stream removed in the reactor and to heat the reactor stream. The outlet temperature $T_2$ is measured and the inlet temperature $T_1$ is controlled by adjusting the relative amount of make-up methane and/or air added to the feed gas.

9 Claims, 2 Drawing Sheets

Figure 1:
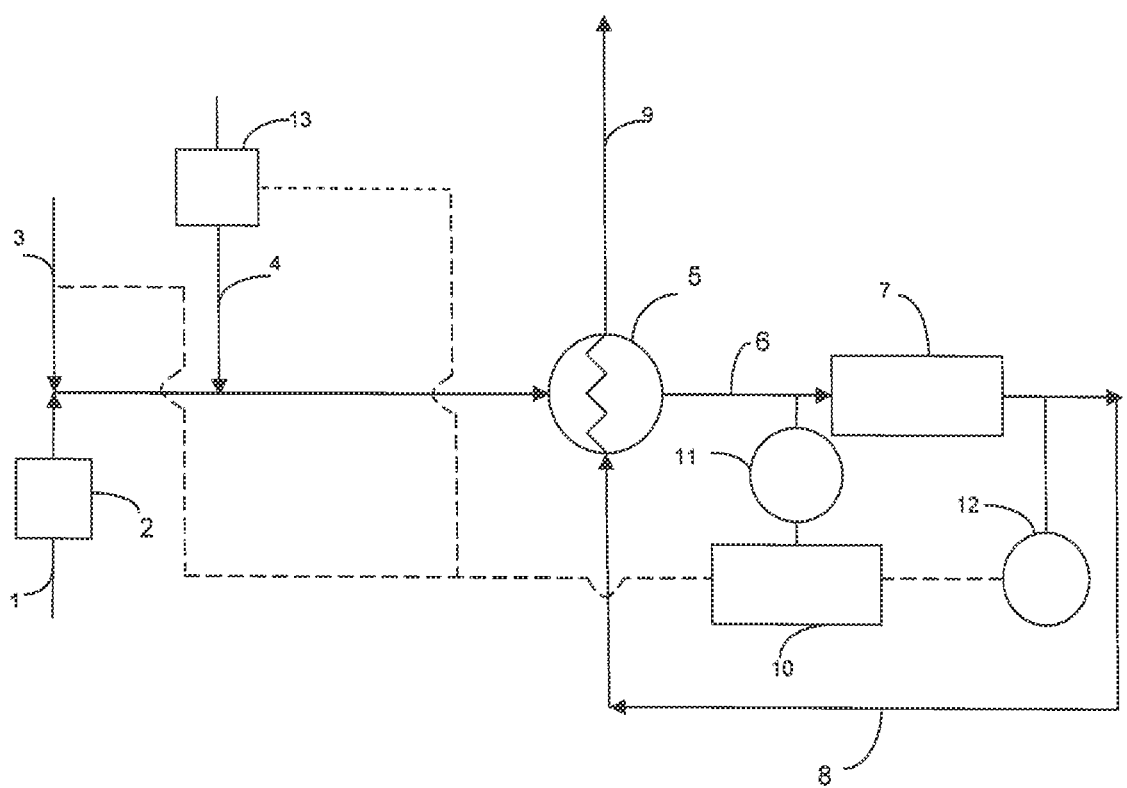

(52) U.S. Cl.
CPC .. *B01D 2257/7025* (2013.01); *B01D 2258/06* (2013.01); *Y02C 20/20* (2013.01)

(56) References Cited

FOREIGN PATENT DOCUMENTS

| | | |
|---|---|---|
| CN | 201301726 Y | 9/2009 |
| CN | 201650343 U | 11/2010 |
| CN | 101906986 A | 12/2010 |
| CN | 102205207 A | 10/2011 |
| CN | 102218286 A | 10/2011 |
| CN | 102225321 A | 10/2011 |
| CN | 102230393 A | 11/2011 |
| CN | 102814148 A | 12/2012 |
| JP | S62254826 A | 11/1987 |
| JP | 2008246473 A | 10/2008 |
| JP | 2011183322 A | 9/2011 |
| WO | 2002040152 A1 | 5/2002 |
| WO | 2014/002818 A1 | 1/2014 |
| WO | 2014/017217 A1 | 1/2014 |
| WO | 2014087344 A1 | 6/2014 |

OTHER PUBLICATIONS

Shi Su, et. al., "An assessment of mine methane mitigation and utilization technologies", Progress in energy and combustion science; 2005, p. 123-170, vol. 31; Australia.

Shi Siz, et. al.,"Catalytic combustion of coal mine ventilation air methane"; Fuel, 2006, p. 1201-1201; vol. 85, Australia.

Toshihiko Sakurai "VOCs Removal"; Catalyst, 1993, p. 304-311, vol. 35, Japan. Abstract only, http://www.shokubai.org/jnl/cgi-bin/ccotw.cgi, last retrieved Jun. 1, 2016.

M.S. Jennings, et., al, "Catalytic incinerations for control of volatile organic compound emissions", 1985, p. 2-17. Noyes Publishing, New Jersey, U.S.A.

J. H. Lee, et., al, "The catalytic combustion of methane and hydrogen sulphide"; Catalysis Today, 1999, p. 353-357, vol. 47; Australia.

International Preliminary Report on Patentability for PCT/GB2014/053126.

D.R. van der Vaart, et al., Thermal and Catalytic Incinerators for the Control of VOCs, Journal of the Air&, Waste Management Association, 41:1, 92-98, Jan. 1991.

* cited by examiner

PROCESS FOR REMOVING METHANE FROM A GAS

The present invention relates to a process for removing methane from a gas. More particularly, it relates to a process for removing methane from a gas in low concentration and in particularly at a concentration of about 1 mole % or less. Still more particularly, it relates to a process for removing methane from coal mine ventilation gas.

A bed of coal will generally contain a substantial amount of methane adsorbed therein, it is generally desirable and possible to remove this methane from the un-mined bed by drainage. The gas recovered will have a relatively high methane concentration which may be in the region of from about 30 mole % to about 95 mole %. It is therefore relatively easy and cost-effective to utilise this methane.

Methane is also found in the gas discharged from the ventilation system of the coal mine. However, unlike the gas from the mine bed, the ventilation gas has a very low concentration of methane which will generally be of the order of only from about 0.1 mole % to about 1 mole %. This is therefore conventionally discharged into the atmosphere with the other gases which make up the ventilation gas discharge.

Although this release of methane is not directly harmful to humans, it is believed that its presence in the atmosphere may contribute to global warming and/or climate change. It is therefore desirable to make alternate arrangements to reduce the amount of methane discharged.

Whilst, in theory, one option for methane recovery would be to concentrate the coal mine ventilation gas such that the amount of methane is higher, such a process would take the concentration though the explosion limit of methane which is typically of from about 5 mole % to about 15 mole % methane. There are therefore significant safety concerns associated with any process which involves a concentration step.

In view of this various alternate methods have been proposed either to use the ventilation gas directly in, for example, turbines or to subject the gas to oxidation in the presence or absence of a suitable catalyst so that the methane present in the gas is oxidised to carbon dioxide and water before it is vented. Examples of oxidation systems are described in CN102230393, CN102225321, CN102218286, CN102205207, CN101418702, CN101906986, CN201301726, CN201650343, and CN101206027.

In oxidation processes, it is generally necessary to heat the gas prior to its contact with the catalyst. However, these processes can be difficult to operate. One problem is that the temperature in the reactor has to be controlled such that it is high enough that reaction will occur but such that it is not too high, since high temperatures can damage and even deactivate the catalyst.

The need to control the temperature during the oxidation process is complicated by the fact that the concentration of methane gas in the ventilation gas stream recovered from a mine fluctuates.

One suggested process for dealing with utilising the gas streams having a low but fluctuating concentration of methane in the ventilation gas from a coal mine is discussed in US2012/0189523. In a first arrangement the proposed method comprises feeding the gas through a heat exchanger in which it is preheated. This preheated gas is then fed to a reactor in which it is contacted with an oxidation catalyst such that the oxidation reaction occurs. The reacted gas is then passed through the heat exchanger such that the heat is recovered by heat exchange with the unreacted gas. The method also includes varying the amount of gas that is fed to the oxidation catalyst depending on the concentration of methane in the gas to be treated such that the gas flow rate is increased when the methane concentration is high and is decreased when the methane concentration is low.

In a second arrangement described in US2012/0189523, the gas to be treated is passed through a low temperature passageway to a heat exchanger so that it is heated. The preheated gas is then fed to a reactor where it is contacted with the oxidation catalyst where the desired oxidation reaction occurs. The reacted gas is then passed through the heat exchanger to allow for heat exchange with the feed gas. In this arrangement some of the stream to the low temperature side or to the high temperature side of the heat exchanger may be passed through a shortcut passageway such that the heat exchanger can be bypassed by a portion of the gas. The ratio of the feed gas to be fed through the shortcut passageway relative to the amount to be fed to the heat exchanger is allowed to vary such that the lower the ratio, the lower the concentration of methane in the feed gas and the higher the ratio, the higher the concentration of methane in the feed gas.

Whilst these processes offer some means of addressing the problems associated with utilising the low concentration methane in gas, such as mine ventilation streams, it is desirable to provide an alternative process for dealing with gas streams comprising an amount of methane which is below the combustion range, such as a ventilation stream from a coal mine.

According to a first aspect of the present invention there is provided a method for removing methane from feed gas having a methane concentration of about 2% or less, said method comprising the steps of:
  (a) optionally mixing the feed gas with make-up methane or make-up air;
  (b) passing the feed gas and optional make-up gas through a heat exchanger to raise the temperature of the gas to the desired inlet temperature $T_1$ of an oxidation reactor;
  (c) passing the heated stream from step (b) to the oxidation reactor containing an oxidation catalyst, where the methane is oxidised;
  (d) removing a gas stream including the products of the oxidation reaction from the reactor, said gas stream being at an outlet temperature $T_2$ which is higher than the inlet temperature $T_1$;
  (e) passing the gas stream removed in step (d) through the heat exchanger against the reactor stream from step (b) to allow the heat to be recovered from the gas stream removed in step (d) and utilised to heat the reactor stream in step (b); and
  (f) measuring the outlet temperature $T_2$ and controlling the inlet temperature $T_1$ by adjusting the relative amount of make-up methane and/or make up air added in step (a).

It will be understood that by controlling the outlet temperature $T_2$, the inlet temperature $T_1$ is controlled.

In one arrangement, the outlet temperature $T_2$ is compared with a pre-determined desired temperature and the concentration of the methane or air in the feed is adjusted such that the inlet temperature $T_1$ is adjusted such that following the temperature rise occasioned by the reaction results in the $T_2$ approaching the desired temperature. $T_1$ will not be adjusted to a temperature which is below a minimum reaction initiation temperature.

The life of the catalyst is maximised in the present invention since the temperatures can be controlled such that temperature-caused degradation of the catalyst is minimised and preferably obviated. In the present invention $T_1$ has to be fixed within an operation range that does not allow $T_2$ to exotherm above the maximum operation temperature of the catalyst. However, variations in the concentration of the methane from the mine will cause fluctuations in the observed exotherm and hence variations in $T_2$. This variation has to be controlled to be below the maximum allowable figure for $T_2$ but also has to be controlled to generate the desired bed inlet temperature $T_1$.

Thus the present invention makes use of the fact that as the methane concentration increases, the exit temperature $T_2$ will increase. If the temperature $T_2$ increases, make-up air can be mixed with the feed so that the methane concentration reduces. Similarly if the temperature $T_1$ is too low to enable operation of the catalyst, addition of make-up methane to increase the methane concentration will increase $T_2$ such that a hotter stream is passed through the heat exchange which in turn will lead to the feed stream temperature increasing as it passes through the heat exchanger and thereby increasing $T_1$.

Any suitable catalyst may be used in the oxidation reactor. In one arrangement the catalyst may be iridium and platinum dispersed on a carried such as an oxidic carrier. Examples of suitable carriers include zirconia, titania, alumina or a mixture thereof. In an alternative arrangement the catalyst may be palladium and/or platinum on a support. The scatalyst may be presented in any suitable configuration but in one arrangement it may be as a coated substrate such as a metallic or ceramic honeycomb configuration.

The desired temperature will depend on the catalyst used. Where the catalyst contains palladium and/or platinum on a support, the $T_1$ is preferably at least 350° C. Temperatures above 650° C. will generally be avoided to maximise the catalyst life and minimise the reactor costs.

As the heated methane containing gas is passed over the catalyst, the methane is oxidised to carbon dioxide and water.

In one arrangement, the flow rate to the reactor will be maintained constant.

It will be understood that the make-up methane optionally added in step (a) may be methane or a gas stream comprising methane. In this latter arrangement, a methane rich stream is preferred.

Thus the present invention allows the system to take account of fluctuations in the methane concentration. The arrangement is sufficiently flexible to quickly vary the amount of make-up methane or make-up air while keeping the overall flow to the catalyst bed fixed.

According to a second aspect of the present invention there is provided a method for removing methane from feed gas having a methane concentration of about 2 mole % or less, said method comprising the steps of:

(a) passing the feed gas through a heat exchanger to raise the temperature of the gas to the desired inlet temperature $T_1$ of an oxidation reactor;

(b) optionally by-passing a portion of the feed around the heat exchanger with optional make-up air;

(c) passing the heated stream from step (a) and any by-passed feed from step (b) to the oxidation reactor containing an oxidation catalyst, where the methane is oxidised;

(d) removing a gas stream including the products of the oxidation reaction from the reactor, said gas stream being at an outlet temperature $T_2$ which is higher than the inlet temperature $T_1$;

(e) passing the gas stream removed in step (d) through the heat exchanger against the reactor stream from step (a) to allow the heat to be recovered from the gas stream removed in step (d) and utilised to heat the reactor stream in step (a); and (f) measuring the outlet temperature $T_2$ and controlling the inlet temperature $T_1$ by adjusting the amount of feed bypassing the heat exchanger.

It will be understood that by controlling the outlet temperature $T_2$, the inlet temperature $T_1$ is controlled.

Mixing the cold bypassed stream with the heated feed stream enables the temperature $T_1$ to the reactor to be controlled. The amount of gas by-passed may be increased as the methane concentration increases which would otherwise result in the increase in the reactor exit temperature.

The catalyst and the temperatures are as discussed above in connection with the above first aspect of the invention.

In either arrangement, a fired start-up heater or other suitable heating method may be provided to heat the reactor to operating conditions.

If the catalyst deactivates the exit gas from the reactor will eventually contain methane. The presence of methane in the exit stream can be detected. These processes may then allow the system to be operated such that $T_1$ can be increased until no further methane in the stream removed from the detector is noted.

The methane concentration in the stream obtained from the reactor may be detected by any suitable means. In one arrangement it may be measured using a non-dispersive infrared absorption analyser that utilises a solid state detector which gives continuous monitoring of methane down to 1 ppm or lower.

The gas feed stream may have less than about 1 mole % methane, or less than about 0.5% mole, or less than about 0.1 mole % methane.

Any suitable gas flow rate may be used. In one arrangement, there may be a gas hourly space velocity of about 20,000 Lgas/Lcatalyst/hr with a linear velocity at the front face of the catalyst of about less than 20 m/s.

Whilst the present invention has been described with reference to the treatment of methane in a ventilation gas from a coal mine, it will be understood that it is equally applicable to other streams in which there is a low concentration of methane.

Figure 2:
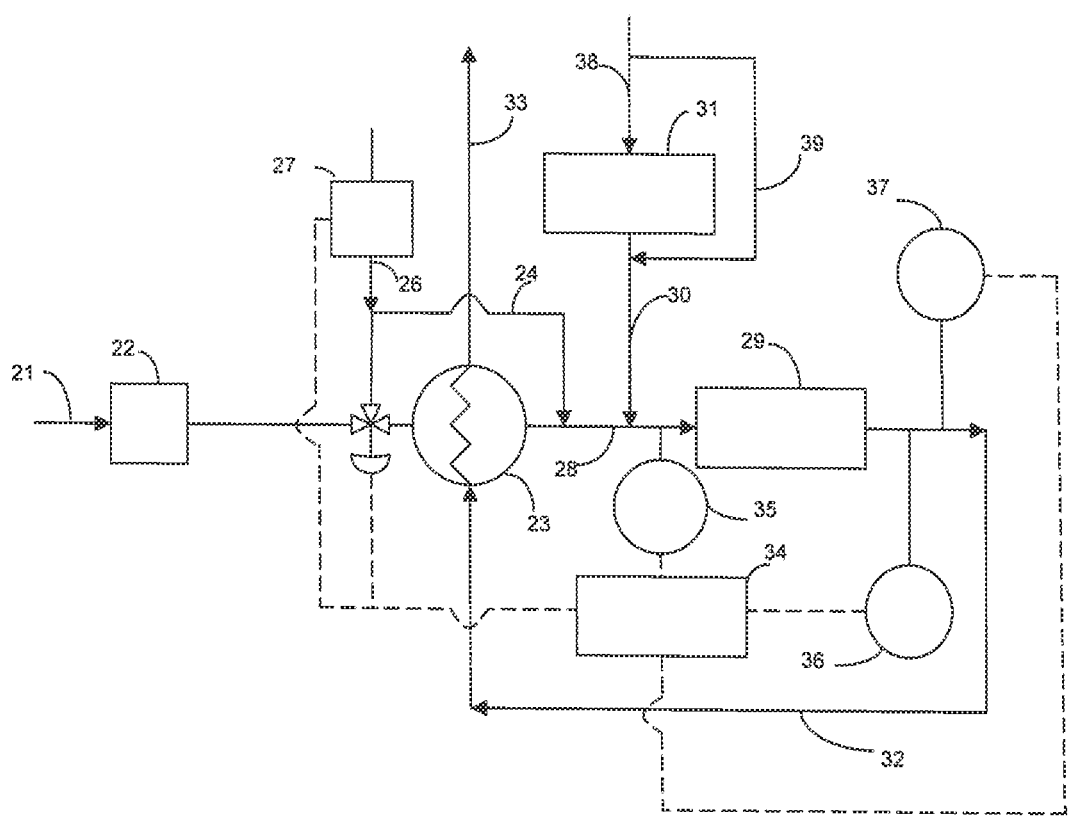

The present invention will now be described by way of example with reference to the accompanying drawings in which:

FIG. 1 is a schematic illustration of a flow sheet according to the first aspect of the present invention; and FIG. 2 is a schematic illustration of a flow sheet according to the second aspect of the present invention.

It will be understood by those skilled in the art that the drawings are diagrammatic and that further items of equipment such as reflux drums, pumps, vacuum pumps, temperature sensors, pressure sensors, pressure relief valves, control valves, flow controllers, flow control dampers, duct work, flame arresters, level controllers, holding tanks, storage tanks, and the like may be required in a commercial plant. The provision of such ancillary items of equipment forms no part of the present invention and is in accordance with conventional chemical engineering practice.

As illustrated in FIG. 1, gas is removed from the mine in line 1 using a fan 2 where it is mixed with optional make-up methane, generally in the form of a methane-rich gas, 3 or optional make-up air in line 4, supplied by fan 13 and then fed to heat exchanger 5 where it is heated to a temperature $T_1$ and it is then fed in line 6 to the reactor 7. In the reactor, the methane is converted to carbon dioxide and water. The gas stream, which will have been heated during the exothermic reaction to the temperature $T_2$, is then removed from the reactor in line 8 where it is passed through the heat exchanger 5 against the incoming feed in line 1 such that it is cooled and the feed stream is heated. The cooled product gas is then removed in line 9.

A controller 10 monitors the temperatures $T_1$ and $T_2$ measured in detectors 11 and 12 and then controls the make-up methane and make-up air as appropriate.

In the alternative arrangement illustrated in FIG. 2, the feed 21 is removed from the mine using the main fan 22 and it is then passed to the heat-exchanger 23 where it is heated. A portion of the feed may be by-passed around the heat exchanger in line 24 and then mixed with the heated feed. A valve 25 controls the by-pass. Make-up air may be added into the by-pass stream in line 26 using fan 27. At start up, methane may be added in line 38 having been passed through the start-up burner 31. It is also possible to add methane via line 38 and 39 which by-passes the start-up burner during normal operation.

The stream is then fed in line 28 to the reactor 29 where reaction occurs. The gas stream is then removed from the reactor 29 in line 32 where it is then passed through the heat-exchanger 23 where it is cooled while heating the feed gas. The cool gas is then released in line 33

A controller 34 monitors the temperatures $T_1$ and $T_2$ measured in detectors 35 and 36 and exit methane analyser 37 and then controls the amount of the by-pass using valve 25 and the amount of make-up air added in line 26.

The invention claimed is:

1. A method for removing methane from feed gas having a methane concentration of 2 mole % or less using a system that includes
   a feed gas line for supplying the feed gas to a heat exchanger, an oxidation reactor that receives feed gas that has been heated by the heat exchanger, and a make-up methane feed line for supplying make-up methane for mixing with the feed gas in the feed gas line, said method comprising the steps of:
   (a) passing the feed gas through the heat exchanger to raise the temperature of the feed gas to a desired inlet temperature of the oxidation reactor;
   (b) passing the heated feed gas from step (a) to the oxidation reactor containing an oxidation catalyst, where the methane in the feed gas is oxidised;
   (c) removing a gas stream including the products of the oxidation reaction from the reactor, said gas stream being at an outlet temperature which is higher than the inlet temperature;
   (d) passing the gas stream removed in step (c) through the heat exchanger against the feed gas from step (a) to allow the heat to be recovered from the gas stream removed in step (c) and utilised to heat the feed gas in step (a);
   (e) comparing the outlet temperature with a pre-determined desired temperature, and, when the outlet temperature falls below the desired temperature, adding make-up methane from the make-up methane feed line to the feed gas in order to increase the methane concentration, such that following the temperature rise occasioned by the reaction, the outlet temperature approaches the desired temperature.

2. The method according to claim 1 wherein the catalyst contains at least one of palladium and platinum on a support.

3. The method according to claim 2 wherein the support is an oxidic support.

4. The method according to claim 1 wherein the catalyst support is presented in a honeycomb configuration.

5. The method according to claim 2 wherein the inlet temperature is at least 350° C.

6. The method according to claim 2 wherein the outlet temperature is 650° C. or less.

7. The method according to claim 1 wherein the feed gas has less than 1 mole % methane.

8. The method according to claim 1 wherein the feed gas has less than 0.5 mole % methane.

9. The method according to claim 1 wherein the feed gas has less than about 0.1 mole % methane.

* * * * *